United States Patent
Kihara

(10) Patent No.: US 8,280,100 B2
(45) Date of Patent: Oct. 2, 2012

(54) IMAGE PROCESSING APPARATUS, IMAGE PROCESSING METHOD, AND COMPUTER PROGRAM PRODUCT

(75) Inventor: Yuka Kihara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 517 days.

(21) Appl. No.: 12/559,898

(22) Filed: Sep. 15, 2009

(65) Prior Publication Data

US 2010/0067736 A1 Mar. 18, 2010

(30) Foreign Application Priority Data

Sep. 17, 2008 (JP) ................................ 2008-238085

(51) Int. Cl.
*G06K 9/00* (2006.01)
(52) U.S. Cl. ...................................................... 382/100
(58) Field of Classification Search .................. 382/100
See application file for complete search history.

(56) References Cited

U.S. PATENT DOCUMENTS

| | | | | |
|---|---|---|---|---|
| 7,324,662 B2 * | 1/2008 | Kot et al. | ...................... | 382/100 |
| 7,489,796 B2 * | 2/2009 | Nakamura et al. | ............ | 382/100 |
| 7,688,993 B2 * | 3/2010 | Kot et al. | ...................... | 382/100 |
| 2008/0304700 A1 | 12/2008 | Kihara | | |
| 2009/0074236 A1 | 3/2009 | Kihara | | |
| 2009/0119583 A1 | 5/2009 | Kihara | | |

FOREIGN PATENT DOCUMENTS

| | | |
|---|---|---|
| JP | 4-294682 | 10/1992 |
| JP | 5-53365 | 7/1993 |
| JP | 8-102860 | 4/1996 |
| JP | 2002-281283 | 9/2002 |
| JP | 3682382 | 5/2005 |
| JP | 2005/204036 | 7/2005 |
| JP | 4298588 | 4/2009 |

* cited by examiner

*Primary Examiner* — Tom Y Lu
(74) *Attorney, Agent, or Firm* — Oblon, Spivak, McClelland, Maier & Neustadt, L.L.P.

(57) ABSTRACT

Encoding information is assigned to each block according to a position of the block in an image of the color image data. An image analyzing unit analyzes the block and outputs a feature value. A block determining unit determines whether the block is an embedding-possible block based on the feature value and demarcates a watermark embedding area in the embedding-possible block. An embedding unit embeds the watermark information by deforming the watermark embedding area according to a pattern that represents the watermark information and replacing a pixel in the watermark embedding area with another pixel near the pixel to be replaced.

7 Claims, 13 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-238085 filed in Japan on Sep. 17, 2008.

BACKGROUND OF THE INVENTION

1. Field of the Invention

The present invention generally relates to a technology for embedding invisible digital watermark in color image data.

2. Description of the Related Art

Recent proliferation of color image forming apparatuses, such as printers and copying machines, has ironically made it easy to produce unauthorized duplication of a printed matter of a color image.

To this end, information embedding (digital watermark) technology has recently been used as a method for preventing unauthorized duplications. However, addition of a visible digital watermark to an image undesirably causes a change in the hue of the image at position of the watermark.

To this end, a digital watermarking technology that makes it possible to embed an invisible digital watermark in image data without causing degradation in image quality has been developed. Japanese Patent No. 3682382 discloses a technique of embedding special information corresponding to digital watermark data in a portion, such as a least significant bit, of image data where influence exerted by the embedding is relatively small. In this technique, image data in RGB color space first is converted to image data in YPbPr color space. Next, bits in only a to-be-watermarked area on a highest-luminance plane among luminance planes of the converted image data are shifted. Thereafter, binary image data is embedded in a bit plane that includes the to-be-watermarked area.

Japanese Patent Application Laid-open No. H4-294682 discloses a technique of adding an image signal corresponding to an output color component of a least noticeable color to a human eye (e.g., yellow). This technique allows embedding of a dot pattern or the like that represents watermark information in the least noticeable manner.

Japanese Patent Application Laid-open No. 2002-281283 discloses a technique of adding new color information to image data having luminance information and color information as follows. In this technique, input image data that is in a first color space is first converted into converted image data in a second color space. New color information that can be represented in the second color space is subsequently added to the converted image data. The converted image data is finally inversely converted into image data in the first color space as output image data.

However, the technique disclosed in Japanese Patent No. 3682382 is disadvantageous in that when image data in which digital watermark data is embedded by using this technique is subjected to low-pass filtering, pixel data on the significant least bit is lost. Moreover, because image compression is generally performed by removing such a portion of image data that affects image quality to a relatively small extent to reduce data amount, when the image data is subjected to such image processing as image compression, the digital watermark data can be lost. Accordingly, the watermark data can be relatively easily lost from the image data, which makes it difficult to detect the digital watermark data having undergone image processing.

The technique disclosed in Japanese Patent Application Laid-open No. H4-294682 is disadvantageous in that addition of a dot pattern that represents watermark information can result in degradation in image quality. Particularly, when the image signal represents an output color component that is not present in an original image, or the dot pattern is added to a lightly-and-uniformly-colored portion of the image, the dot pattern can be inappropriately visible and obtrusive.

The technique disclosed in Japanese Patent Application Laid-open No. 2002-281283 is disadvantageous in that when a value of the new color information to be added is equal to or below an intermediate value between a maximum value and a minimum value, which depends on a number of color tones within the range of the second color space, the act of adding new color information to image translates to adding or removing specific information from the color information of the image data. Accordingly, hue of an image reproduced based on the output image data can differs from its original image.

SUMMARY OF THE INVENTION

It is an object of the present invention to at least partially solve the problems in the conventional technology.

According to an aspect of the present invention, there is provided an image processing apparatus that embeds watermark information in color image data that has been divided into a plurality of blocks, each of which includes a plurality of pixels and to each of which encoding information is assigned according to a position of the block in an image of the color image data. The image processing apparatus includes an image analyzing unit configured to output feature of the block based on an analysis of image data of the block; a block determining unit configured to determine whether the block is an embedding-possible block in which the watermark information can be embedded based on the feature value of the block and to demarcate, for the embedding-possible block, a watermark embedding area that is an area in which the watermark information is to be embedded in the embedding-possible block; and an embedding unit configured to embed the watermark information by deforming the watermark embedding area of the embedding-possible block according to a pattern that represents the watermark information and replacing a pixel in the watermark embedding area with another pixel near the pixel to be replaced.

According to another aspect of the present invention, there is provided an image processing method of embedding watermark information in color image data that has been divided into a plurality of blocks, each of which includes a plurality of pixels and to each of which encoding information is assigned according to a position of the block in an image of the color image data. The image processing method includes outputting a feature value of the block by analyzing image data of the block; determining including determining whether the block is an embedding-possible block in which the watermark information can be embedded based on the feature value of the block and demarcating, for the embedding-possible block, a watermark embedding area that is an area in which the watermark information is to be embedded in the embedding-possible block; and embedding the watermark information by deforming the watermark embedding area of the embedding-possible block according to a pattern that represents the watermark information and replacing a pixel in the watermark embedding area with another pixel near the pixel to be replaced.

According to still another aspect of the present invention, there is provided a computer program product stored on a computer readable storage medium for execution of the above image processing method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Examples of image processing apparatuses according to embodiments of the present invention, the examples in each of which the invention is applied to an MFP that has a plurality of functions such as a printer, a copying machine, and a printer and is provided in one casing, will be described below. Note that the image processing apparatuses of the present invention are not limited to MFPs, and the invention can be applied to any apparatus, such as a copying machine, a scanner, and a facsimile machine, capable of reading image data. The MFPs are described below as the examples; however, examples are not limited MFPs, and can be personal computers (PCs).

Figure 1:
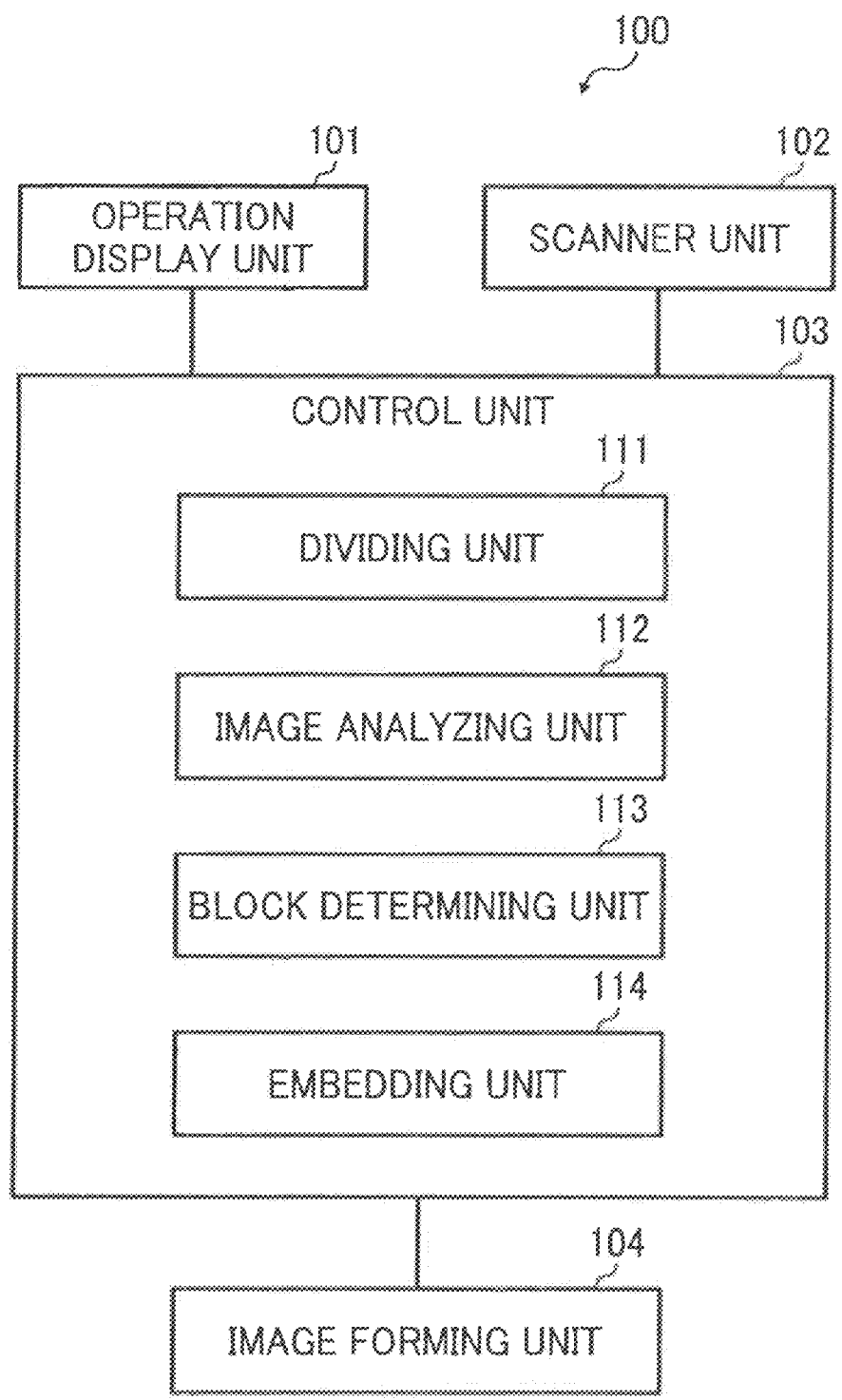
FIG. 1 is a functional block diagram a multifunction product (MFP) according to a first embodiment of the present invention.

FIG. 1 is a block diagram of an MFP 100 according to a first embodiment of the present invention. The MFP 100 acquires image data by scanning an original, and obtains luminance information from the image data. The MFP 100 essentially includes an operation display unit 101, a scanner unit 102, a control unit 103, and an image forming unit 104. The control unit 103 essentially includes a dividing unit 111, an image analyzing unit 112, a block determining unit 113, and an embedding unit 114.

The operation display unit 101 includes a display unit (not shown) on which various screens can be displayed. The operation display unit 101 displays a touch screen (not shown) and/or operation keys (not shown) by using which a user inputs a setting parameter related to acquisition of image data and the like.

The scanner unit 102 scans an original to obtain image data. The scanner unit 102 scans the original by using, for example, a charge coupled device (CCD).

The dividing unit 111 divides the image data acquired by the scanner unit 102 into blocks of, for example, a plurality of pixels. For example, the dividing unit 111 divides the image data into blocks of 12×8 pixels. The dividing unit 111 embeds encoding information, i.e., either 0 or 1, in each block. When 0 is embedded in a block, the pixels in that block are shifted to a side of the pixels where luminance values are relatively large. When 1 is embedded in a block, the pixels in that block are shifted to a side of the pixels where luminance values are relatively small.

The image analyzing unit 112 analyzes the image data in the blocks to detect an edge between areas of different luminance values. The edge detection can be performed by using known methods, which is not limited to a specific method.

The block determining unit 113 determines whether a value of edge strength (hereinafter, "edge strength value") of the edge in the blocks is larger than a predetermined threshold value. When the edge strength value is determined to be larger than the threshold value, the block is determined as a block in which watermark information can be embedded (hereinafter, "embedding-possible block").

The embedding unit 114 adds a deforming pattern to a watermark embedding area in the embedding-possible block, which has been determined by the block determining unit 113. The deforming pattern represents the watermark information and depends on the edge strength. The embedding unit 114 then replaces pixels on the edge in the embedding-possible block with pixels near the pixel to be replaced. The replacement of the pixels is performed based on the encoding information embedded in the block by the dividing unit 111.

Figure 2:
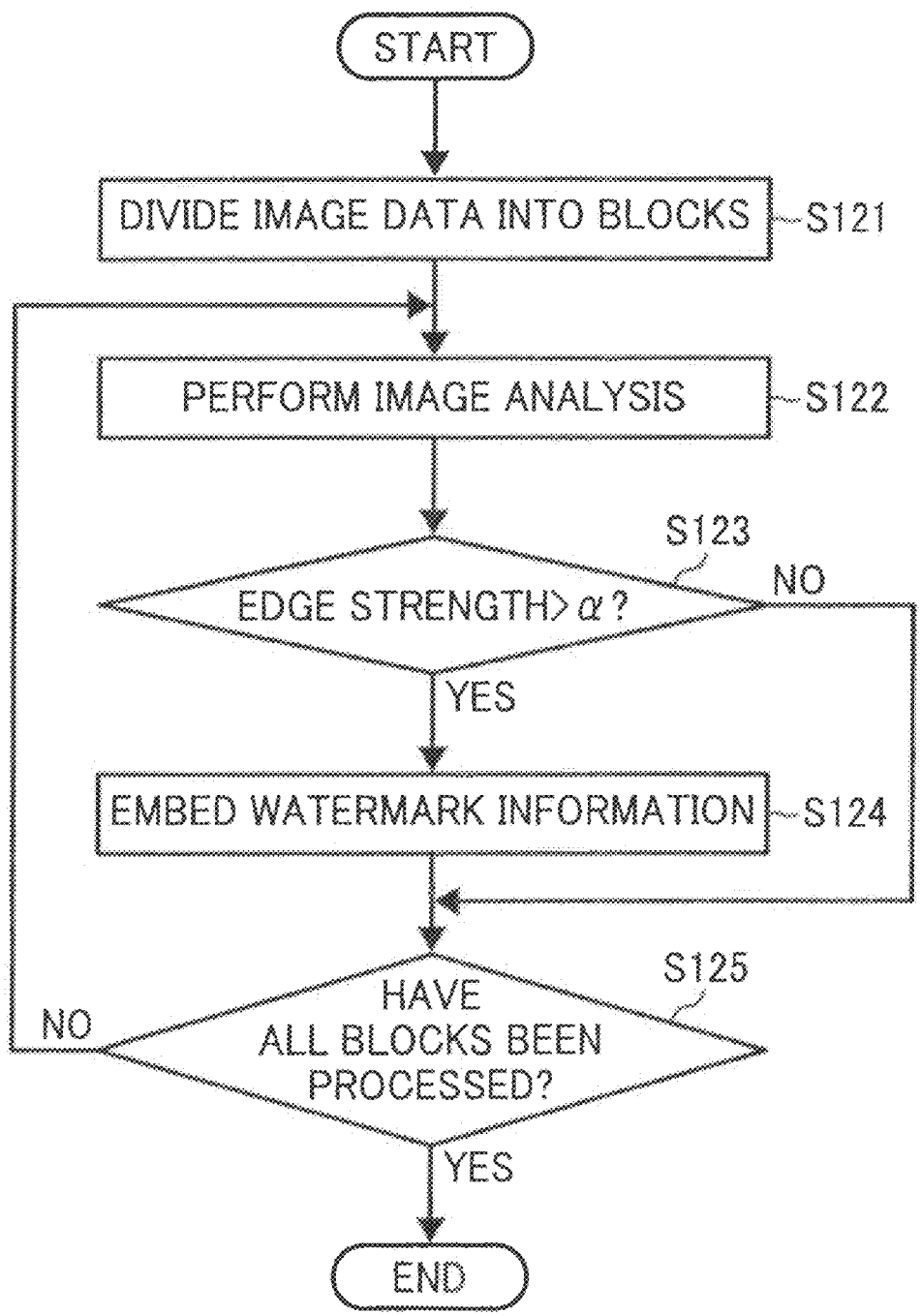
FIG. 2 is a flowchart illustrating an overview of a system control for embedding watermark information according to the first embodiment.

FIG. 2 is a flowchart illustrating an overview of a system control for embedding watermark information according to the first embodiment. The dividing unit 111 divides image data into a predetermined number of blocks (Step S121) and assigns one-bit information, which corresponds to the encoding information, to each of the blocks. For example, watermark information can be embedded in an image such that, all the blocks on a first line of the image data are used to encode a first bit, and similarly all the blocks on a k-th line of the image data are used to encode a k-th bit. A set of blocks that represents the same bit are desirably arranged all over an image of the image data.

The image analyzing unit 112 analyzes image data of each block to detect an edge zone between adjacent areas of different luminance values (Step S122). The image analyzing unit 112 determines whether the block in which an edge zone has been detected is an embedding-possible block based on the width of the edge zone (Step S122). When the block is determined to be an embedding-possible block, the image analyzing unit 112 determines whether an edge strength value of the embedding-possible block is larger than a predetermined threshold value α (Step S123).

When the edge strength value of the block is determined to be larger than the threshold value α (Yes at Step S123), watermark information is embedded in the block by adding the deforming pattern to the block (Step S124). When the edge strength value of the block is determined to be equal to or smaller than the threshold value α (No at Step S123), the system control is passed to Step S122 without embedding watermark information in the block. At Step S125, it is determined whether all the blocks have been processed.

When all the blocks have been processed (Yes at Step S125), the process is completed. When not all the blocks have been processed (No at Step S125), the system control is returned to Step S122 to repeat the operations.

Figure 3:
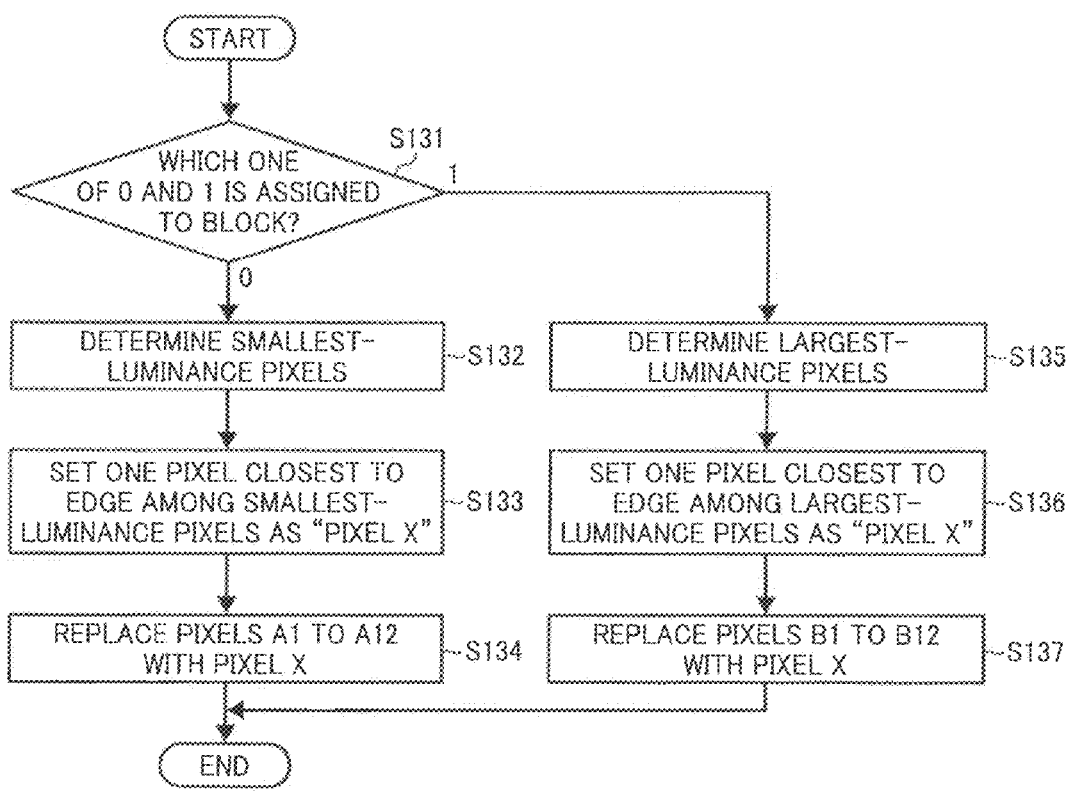
FIG. 3 is a flowchart of a process procedure for embedding watermark information according to the first embodiment.

How watermark information is embedded in a block (Step S124) will be described in detail below. FIG. 3 is a flowchart of a process procedure for embedding watermark information according to the first embodiment. In the first embodiment, when the encoding information assigned to the block is 0, the pixels on an edge therewithin are shifted to a side where the luminance values are relatively large while when the encoding information assigned to the block is 1, the pixels on an edge therewithin are shifted to a side where the luminance values are relatively small.

Figure 4:
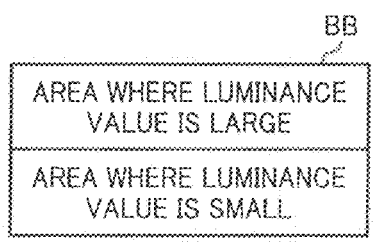
FIG. 4 is a schematic exemplary diagram for explaining the concept of an edge in a block.
Figure 5:
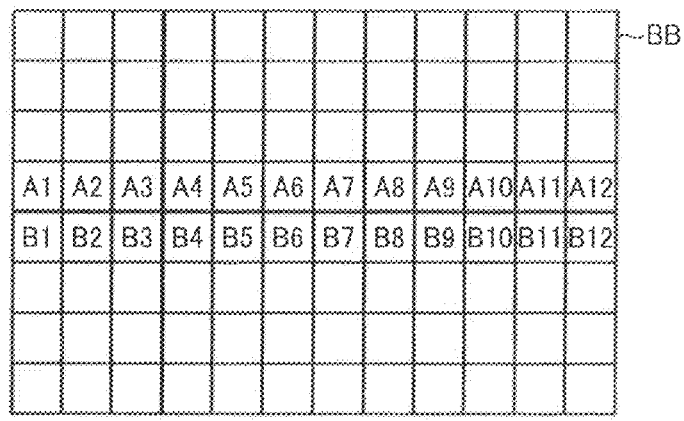
FIG. 5 is a schematic exemplary diagram of a block obtained by dividing image data according to the first embodiment.

Assume that image data is divided into blocks of 12×8 pixels a certain block BB has an edge as depicted in FIG. 4. In this example, watermark information is embedded in the block BB by replacing pixels on the edge with a pixel X in the block BB as depicted in FIG. 5. The pixel replacement will be described in detail below.

Figure 6A:
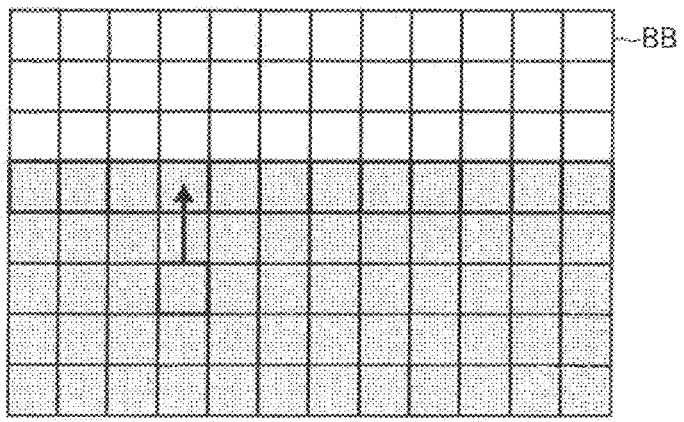
FIGS. 6A and 6B are schematic diagrams illustrating directions in which an edge is shifted.

Which one of 0 and 1 is to be assigned to each block as the encoding information (embedding data) is determined and the encoding information is embedded in the corresponding block (Step S131). When 0 is assigned to the block (0 at Step S131), the edge is shifted to the side where the luminance values are relatively large. More specifically, smallest-luminance pixels of which luminance value is the smallest in the block are determined (Step S132). One pixel closest to the edge among the smallest-luminance pixels is determined as the pixel X (Step S133). Pixels denoted by A1 to A12 on the edge in the block BB depicted in FIG. 5 are replaced with the pixel X (Step S134). As a result, as depicted in FIG. 6A, the edge in the block BB is shifted to an upper portion where the luminance value is relatively large in FIGS. 5 to 6B.

Figure 6B:
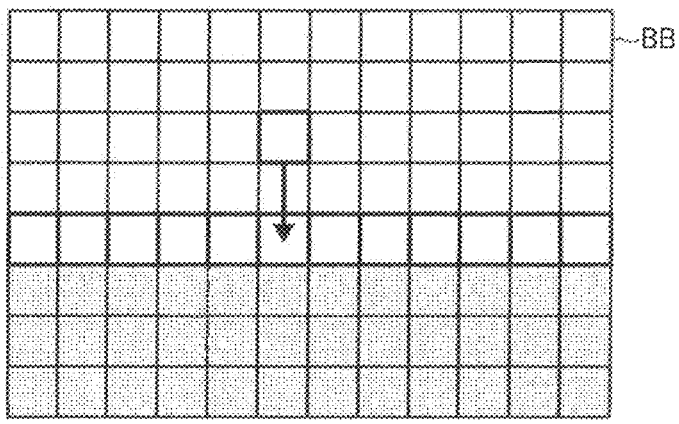

When 1 is assigned to the block as the encoding information (1 at Step S131), largest-luminance pixels of which luminance value is the largest in the block BB are determined (Step S135). One pixel closest to the edge among the largest-luminance pixels is determined as the pixel X (Step S136). Pixels denoted by B1 to B2 of the block BB depicted in FIG. 5 are replaced with the pixel X (Step S137). As a result, as depicted in FIG. 6B, the edge in the block BB is shifted to a lower portion where the luminance value is relatively small in FIGS. 5 to 6B.

The relationship between the embedding data and the deforming pattern is not limited to the example explained above. An edge that is arranged substantially in a center portion of the block and that extends horizontally has been explained above; however, watermark information can be embedded to any edge irrespective of the location and direction of the edge.

In this manner, in the first embodiment, watermark information is embedded by replacing a pixel in the watermark embedding area with another pixel near the pixel to be replaced. Because no color component that is present in the original image is added or removed from the image data, even when watermark information is embedded in the image data, faithful color tones of the original image can be reproduced from the image data. Hence, the watermark information can be embedded without degrading the image quality. Because the deforming pattern is added to the edge zone in the watermark embedding area that is determined based on analysis of the image, even when image data to which the deforming pattern is added subjected to low-pass filtering or the like during image compression, loss of pixel information does not occur. Accordingly, it is possible to detect watermark information embedded in the image data even after image compression.

In the MFP 100 of the first embodiment, the embedding unit 114 replaces a pixel in a watermark embedding area with another pixel near the pixel to be replaced. On the contrary, an MFP 200 according a second embodiment of the present invention embeds encoded in gray-scaled-by-dithering color image data by replacing a first group of pixels in a watermark embedding area with a second group of pixels in an area adjacent to the first group of pixels.

Figure 7:
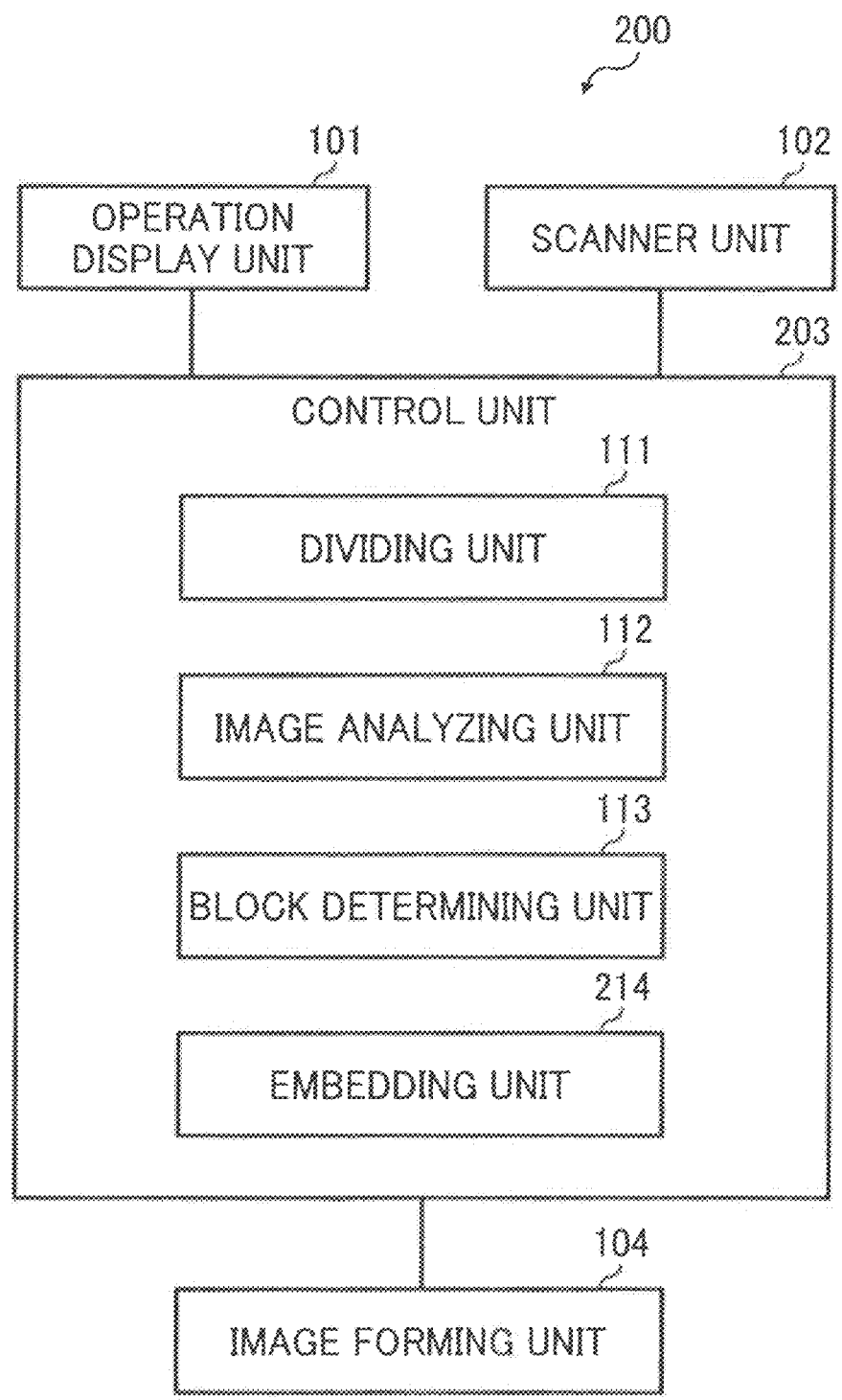
FIG. 7 is a functional block diagram of an MFP according to a second embodiment of the present invention.

FIG. 7 is a block diagram of the MFP 200 according to the second embodiment. The MFP 200 acquires image data by scanning an original, and obtains luminance information from the image data. The MFP 200 essentially includes the operation display unit 101, the scanner unit 102, a control unit 203, and the image forming unit 104. The control unit 203 essentially includes the dividing unit 111, the image analyzing unit 112, the block determining unit 113, and an embedding unit 214.

Because the configurations and functions of the operation display unit 101, the scanner unit 102, and the image forming unit 104 are similar to those of the first embodiment, repeated descriptions are omitted. Moreover, because the configurations and functions of the dividing unit 111, the image analyzing unit 112, and the block determining unit 113 of the control unit 203 are similar to those of the first embodiment, repeated descriptions are omitted.

The embedding unit 214 causes an edge zone of an embedding-possible block to be deformed according to a pattern that represents the watermark information. More specifically, the embedding unit 214 replaces a first group of pixels (hereinafter, in some cases, "replacement sub-block") on an edge of the block with a second group of pixels near the first group of pixels. The second group of pixels is arranged on a side specified by the encoding information.

A method of embedding watermark information in a block whose edge is at, for example, a center portion of the block (see FIG. 4) will be described. The overview of system control for embedding watermark information in the second embodiment is similar to that of the first embodiment explained above with reference to FIG. 2.

Figure 8:
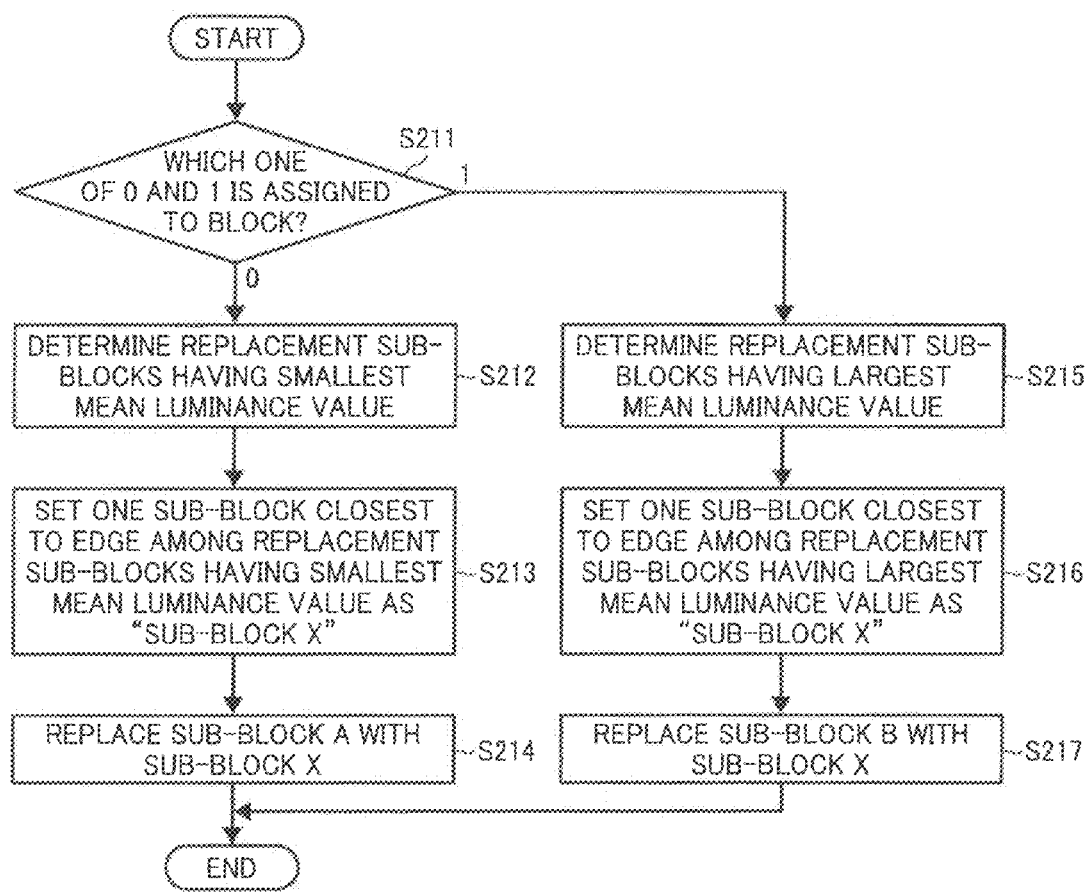
FIG. 8 is a flowchart of a process procedure for embedding watermark information according to the second embodiment.

FIG. 8 is a flowchart of a process procedure for embedding watermark information according to the second embodiment. Watermark information is embedded in a block in the second embodiment by replacing a replacement sub-block with a second sub-block near the replacement sub-block such that an edge in the block is shifted upward when the encoding information assigned to the block is 0 as while the edge is shifted downward when the encoding information is 1.

Figure 9:
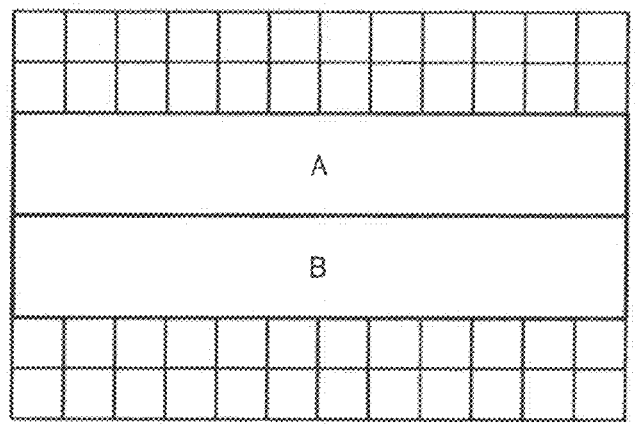
FIG. 9 is a schematic diagram depicting groups of pixels that are obtained by dividing image data into belt-like sub-blocks according to the second embodiment.
Figure 10A:
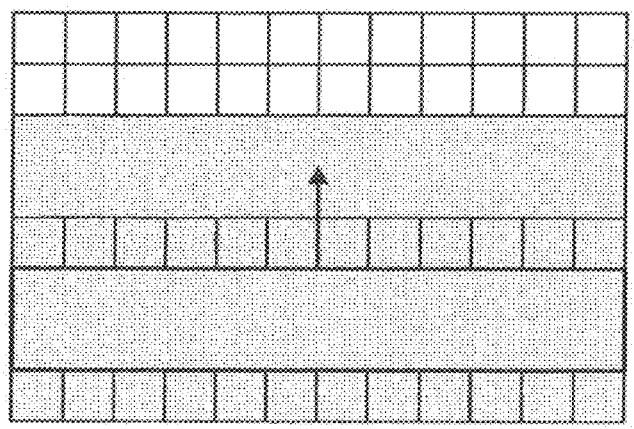
FIGS. 10A and 10B are schematic diagrams of blocks in which watermark information has been embedded according to the second embodiment.

More specifically, which one of 0 and 1 is to be assigned to each block as the encoding information (embedding data) is determined and the encoding information is embedded in the corresponding block (Step S211). When the encoding information assigned to the block is 0 (0 at Step S211), a mean luminance value of each of sub-blocks of the block is calculated to determine replacement sub-blocks whose mean luminance values are the smallest in the block (Step S212). Examples of the sub-blocks are a sub-block A and a sub-block B depicted in FIG. 9 each of which has a longitudinally extending belt-like shape and includes 12×2 pixels. One sub-block closest to an edge among the replacement sub-blocks is determined as a sub-block X (Step S213). The sub-block A depicted in FIG. 9 is thereafter replaced with the sub-block X (Step S214). As a result, as depicted in FIG. 10A, the edge in the block is shifted upward.

Figure 10B:
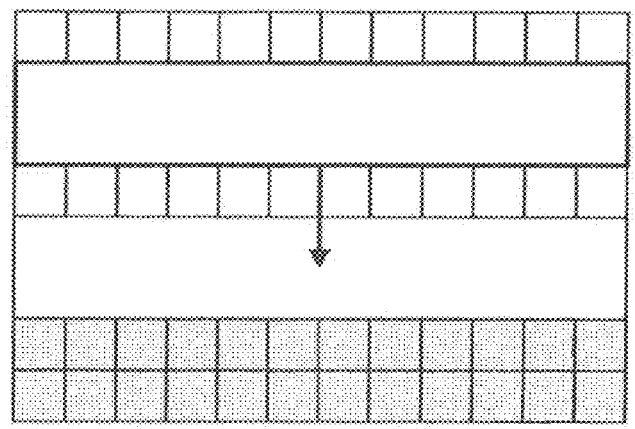

When the encoding information (embedding data) assigned to the block is 1 (1 at Step S211), a mean luminance value of each of sub-blocks of the block is calculated to determine replacement sub-blocks whose mean luminance values are the largest in the block (Step S215). One sub-block closest to the edge among the replacement sub-blocks is determined as the sub-block X (Step S216). The sub-block B depicted in FIG. 9 is thereafter replaced with the sub-block X (Step S217). As a result, as depicted in FIG. 10B, the edge in the block is shifted downward.

In this manner, in the second embodiment, when watermark information is to be embedded in gray-scaled-by-dithering color image data, the watermark information is embedded by replacing a replacement sub-group in a watermark embedding area with another sub-group in an area adjacent to the replacement sub-group. Accordingly, because the watermark information is embedded without adding to or removing from specific information to color components of the original image data, the watermark information can be embedded without degrading the image quality.

In the MFP 100 of the first embodiment, the embedding unit 114 embeds watermark information by replacing a pixel in a watermark embedding area with another pixel near the pixel to be replaced. On the contrary, an MFP 300 according to a third embodiment of the present invention performs pixel replacement differently depending on a result of detection of a halftone tone area when watermark information is to be embedded is color image data that includes a halftone dot area, such as gray-scaled-by-dithering color image data.

Figure 11:
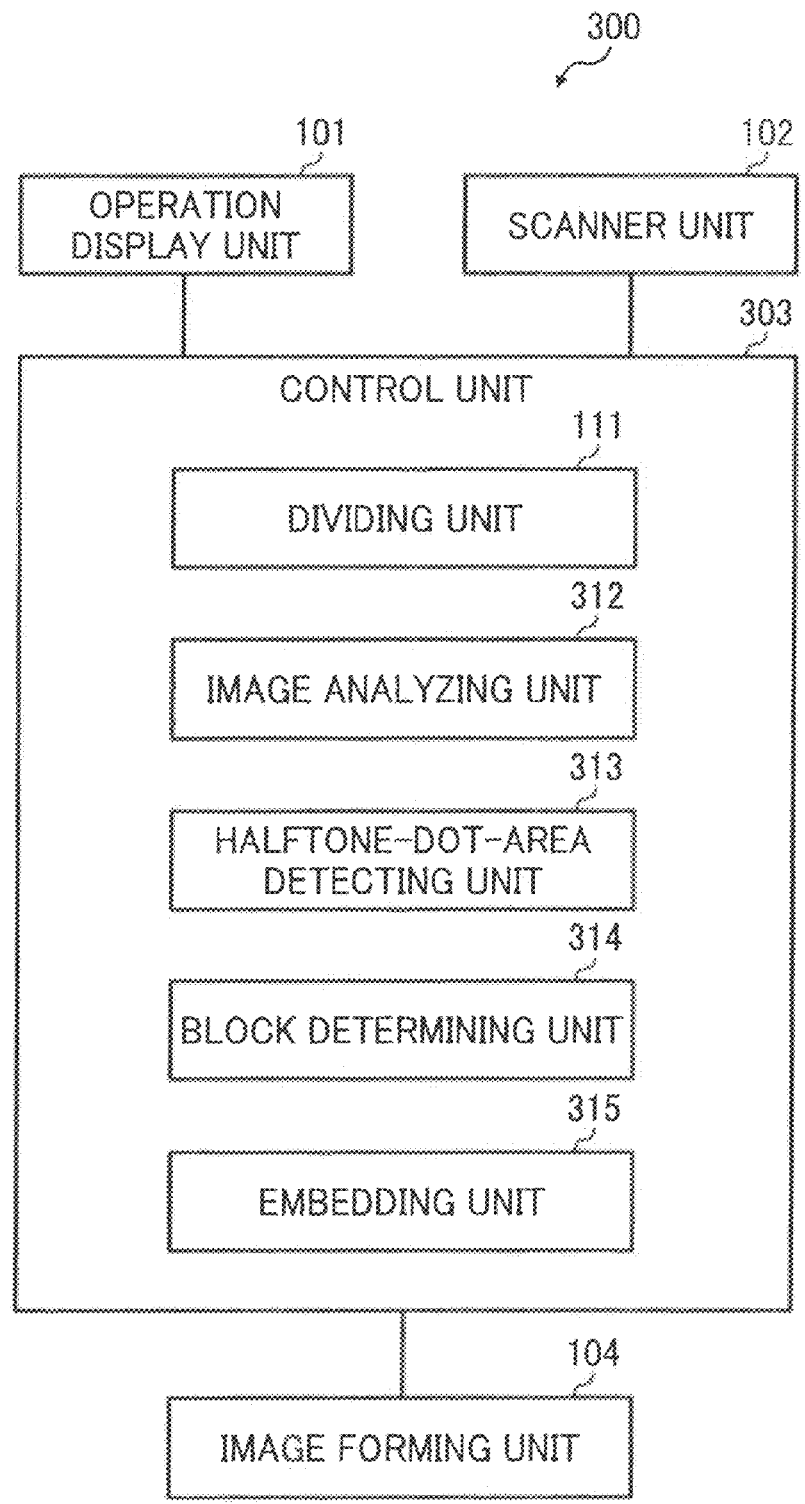
FIG. 11 is a functional block diagram of an MFP according to a third embodiment of the present invention.

FIG. 11 is a block diagram of the MFP 300 according to the third embodiment. The MFP 300 acquires image data by scanning an original, and obtains luminance information from the image data. The MFP 300 essentially includes the operation display unit 101, the scanner unit 102, a control unit 303, and the image forming unit 104. The control unit 303 essentially includes the dividing unit 111, an image analyzing unit 312, a halftone-dot-area detecting unit 313, a block determining unit 314, and an embedding unit 315.

Because the configurations and functions of the operation display unit 101, the scanner unit 102, and the image forming unit 104 are similar to those of the first embodiment, repeated descriptions are omitted. Moreover, because the configuration and function of the dividing unit 111 of the control unit 303 are similar to those of the first embodiment, repeated descriptions are omitted.

The image analyzing unit 312 analyzes the image data in the blocks to detect an edge between areas of different luminance values. The edge detection can be performed by using known methods, which is not limited to a specific method.

The halftone-dot-area detecting unit 313 detects a halftone dot area in a block. For example, a halftone dot area can be detected by detecting halftone dots based on a change in density of data and then detecting a halftone dot area by utilizing the result of detection of the halftone dots as disclosed in Japanese Patent Application Laid-open No. 2002-290719.

The block determining unit 314 determines whether an edge strength value of an edge in the block is larger than a predetermined threshold value. When the edge strength value is determined to be larger than the threshold value, the block determining unit 314 determines that the block is an embedding-possible block.

The embedding unit 315 causes an edge zone in an embedding-possible block to be deformed according to a pattern that represents the watermark information. More specifically, the embedding unit 315 replaces a pixel on the edge zone with another pixel near the pixel. The other pixel is arranged, relative to the pixel to be replaced, on a side specified by the encoding information.

Figure 12:
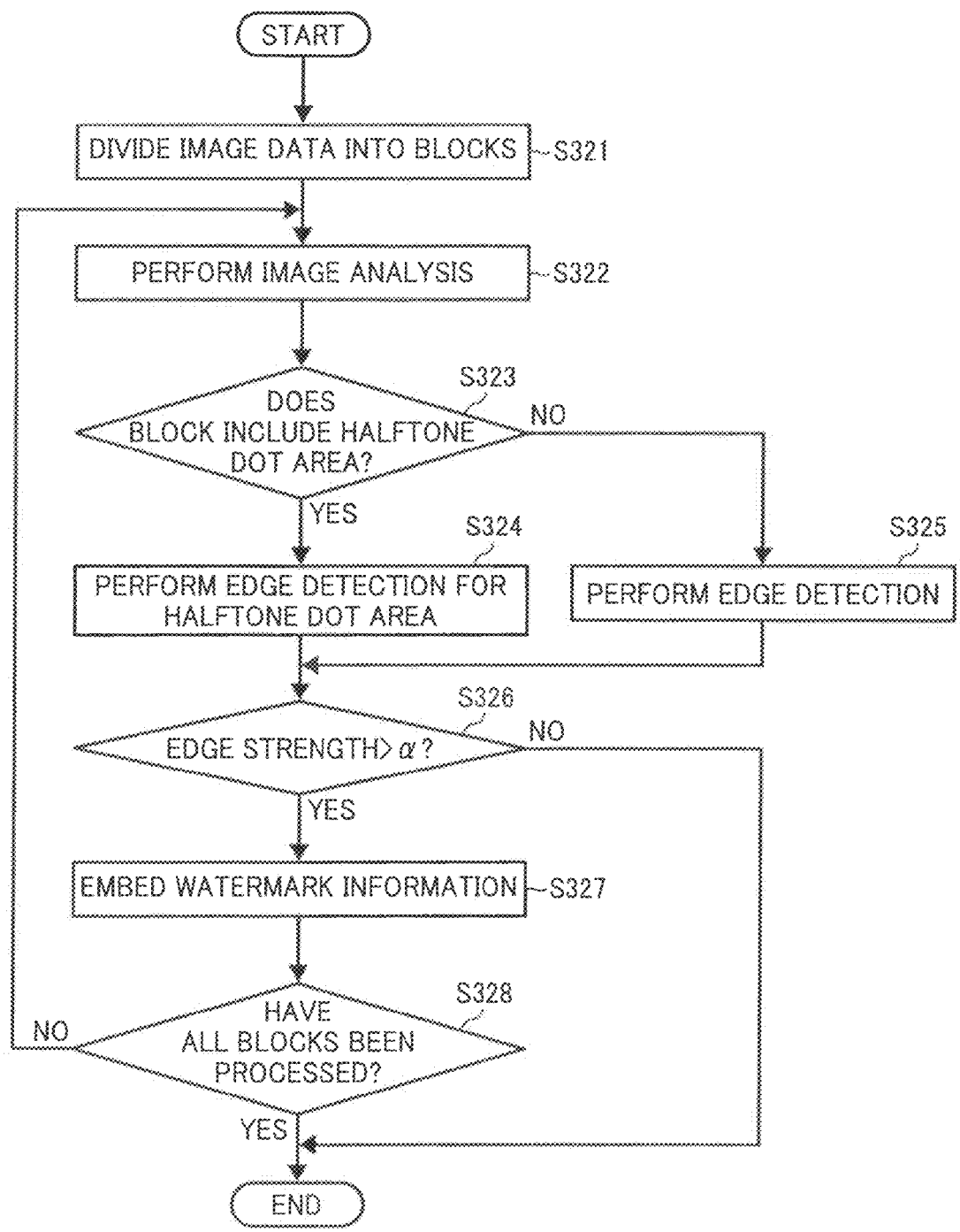
FIG. 12 is a flowchart illustrating an overview of a system control for embedding watermark information according to the third embodiment.

FIG. 12 is a flowchart illustrating an overview of system control for embedding watermark information according to the third embodiment. As in the first embodiment, the dividing unit 111 divides image data into blocks (Step S321), which are then subjected to image analysis performed by the image analyzing unit 312 (Step S322). The halftone-dot-area detecting unit 313 determines whether each of the image-analyzed blocks includes a halftone area on a block-by-block basis (Step S323).

When the halftone-dot-area detecting unit 313 determines that the block includes a halftone dot area (Yes at Step S323), edge detection is performed by a known edge detection technique for a halftone dot area (Step S324). When the halftone-dot-area detecting unit 313 determines that the block does not include a halftone dot area (No at Step S323), edge detection is performed in a similar manner with the manner mentioned previously (Step S325).

Whether an edge strength value of the block is larger than the threshold value $\alpha$ is determined (Step S326). When the edge strength value is determined to be larger than the threshold value $\alpha$ (Yes at Step S326), the embedding unit 315 embeds watermark information in the block (Step S327). When the edge strength value is determined to be equal to or smaller than the threshold value $\alpha$ (No at Step S326), the process is terminated. At Step S328, it is determined whether all the blocks have been processed, and if there is a non-processed block, the system control returns to Step S322. Thus, the series of operations is repeatedly performed until all the blocks have been processed (Step S328).

The embedding pertaining to Step S327 is performed in a similar manner with the manner of the first embodiment or the second embodiment.

In this manner, according to the third embodiment, when watermark information is to be embedded in color image data a portion of which is a halftone dot area, a range of a watermark embedding area is changed depending on a result of determination as to whether a block includes a halftone dot area. Hence, even when image data in which watermark information is to be embedded has a plurality of color components, the watermark information can be embedded in the image data without adding or removing a color component that has not been present in the original image to or from the original image data. Accordingly, even when watermark information is embedded in image data, faithful color tones of the original image can be reproduced from the image data.

In the MFP 100 of the first embodiment, the embedding unit 114 embeds watermark information by replacing a pixel in a watermark embedding area with another pixel near the pixel to be replaced. On the contrary, an MFP 400 according to a fourth embodiment of the present invention defines the watermark embedding area, if a block in which the watermark information is to be embedded includes an edge, by causing a distance by which an edge is shifted for edge deformation to vary depending on edge strength.

Figure 13:
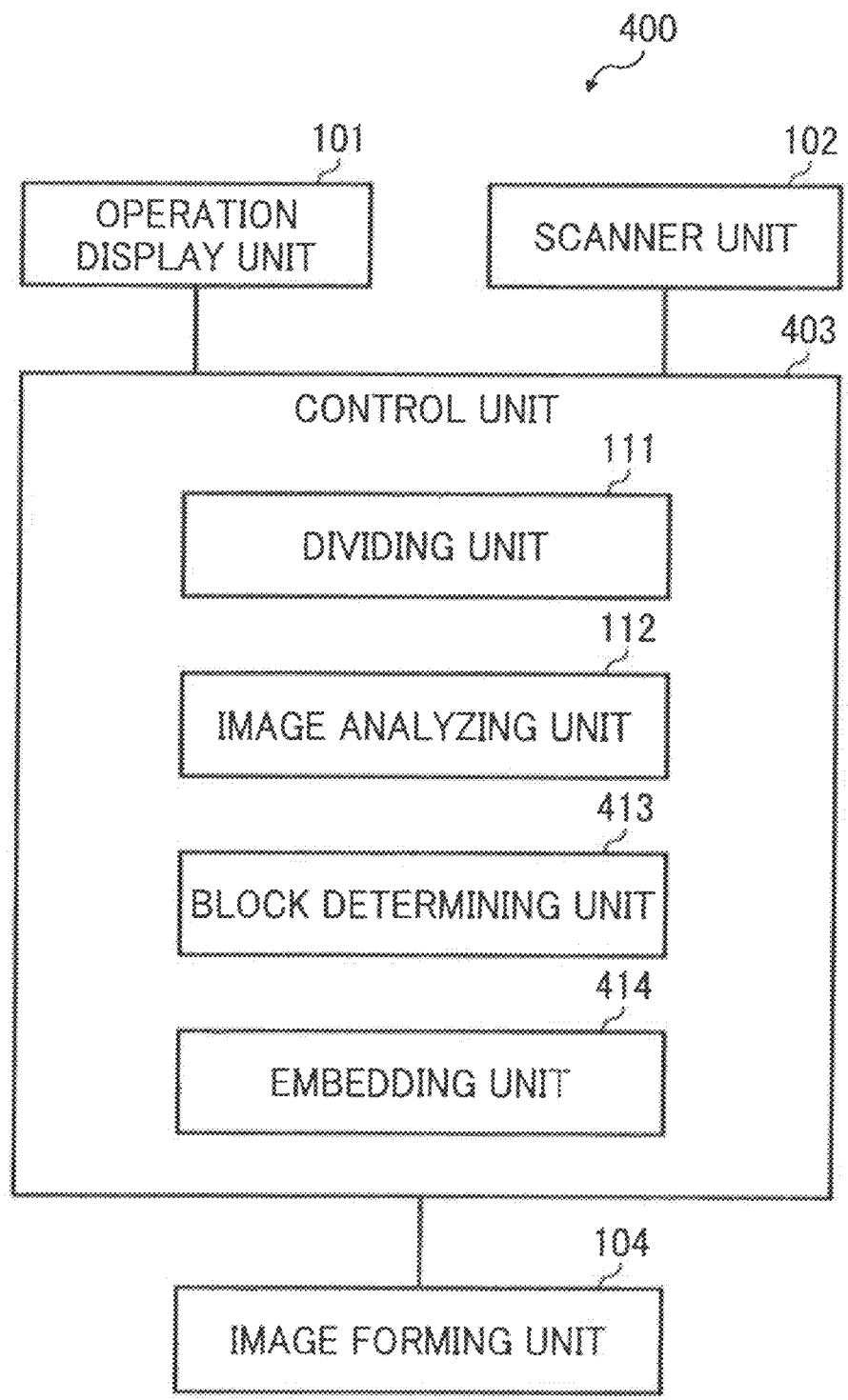
FIG. 13 is a functional block diagram of an MFP according to a fourth embodiment of the present invention.

FIG. 13 is a block diagram of the MFP 400 according to the fourth embodiment. The MFP 400 acquires image data by scanning an original, and obtains luminance information from the image data. The MFP 400 essentially includes the operation display unit 101, the scanner unit 102, a control unit 403, and the image forming unit 104. The control unit 403 essentially includes the dividing unit 111, the image analyzing unit 112, a block determining unit 413, and an embedding unit 414.

Because the configurations and functions of the operation display unit 101, the scanner unit 102, and the image forming unit 104 are similar to those of the first embodiment, repeated descriptions are omitted. Moreover, because the configurations and functions of the dividing unit 111 and the image analyzing unit 112 of the control unit 403 are similar to those of the first embodiment, repeated descriptions are omitted.

The image analyzing unit 112 analyzes the image data in the blocks to detect an edge between areas of different luminance values. The edge detection can be performed by using known methods, which is not limited to a specific method.

The block determining unit 413 determines whether each block is an embedding-possible block. The embedding unit 414 causes an edge zone in an embedding-possible block to be deformed according to a pattern that represents the watermark information. Thereafter, the embedding unit 414 replaces pixels, causing the edge to be shifted by a distance that depends on edge strength. The distance by which the edge is to be shifted varies such that the higher the edge strength, the larger the distance and vice versa.

Figure 14:
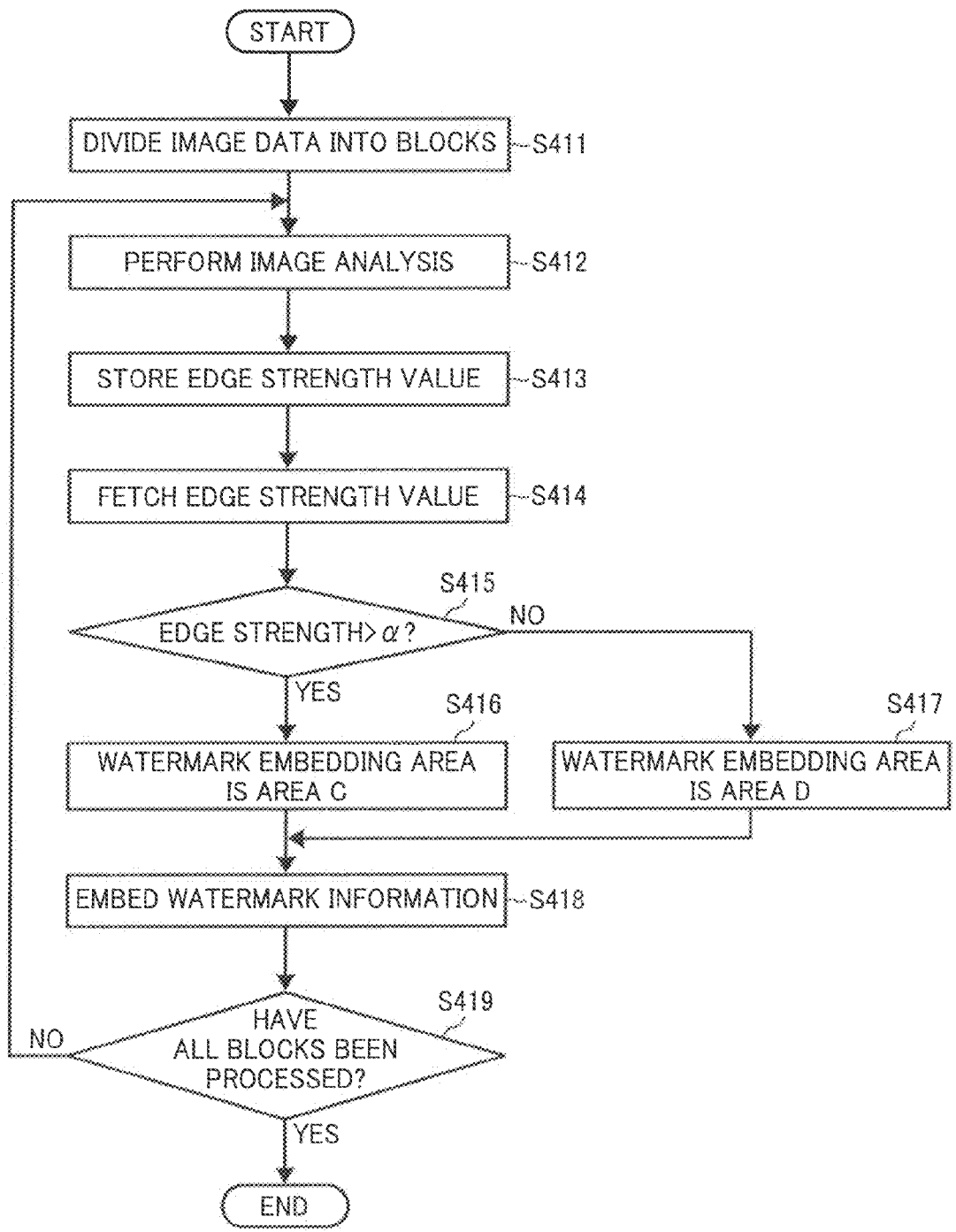
FIG. 14 is a flowchart illustrating an overview of a system control for embedding watermark information according to the fourth embodiment.

FIG. 14 is a flowchart illustrating an overview of system control for embedding watermark information according to the fourth embodiment. In the fourth embodiment, watermark information is embedded by deforming an edge and the distance by which the edge is shifted is changed depending on the edge strength.

As in the first embodiment, the dividing unit 111 divides image data into blocks (Step S411), which are then subjected to image analysis performed by the image analyzing unit 112 (Step S412). When the image analyzing unit 112 has detected an edge, an edge strength value is stored in a storage unit or the like (Step S413). The stored edge strength value is fetched from the storage unit (Step S414). Whether the edge strength value is larger than the threshold value α is determined (Step S415).

Figure 15A:
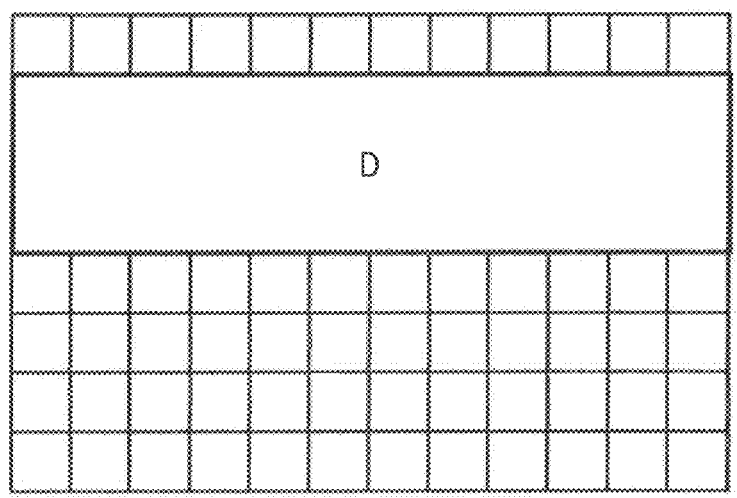
FIGS. 15A and 15B are schematic diagrams of blocks in which watermark information has been embedded according to the fourth embodiment.
Figure 15B:
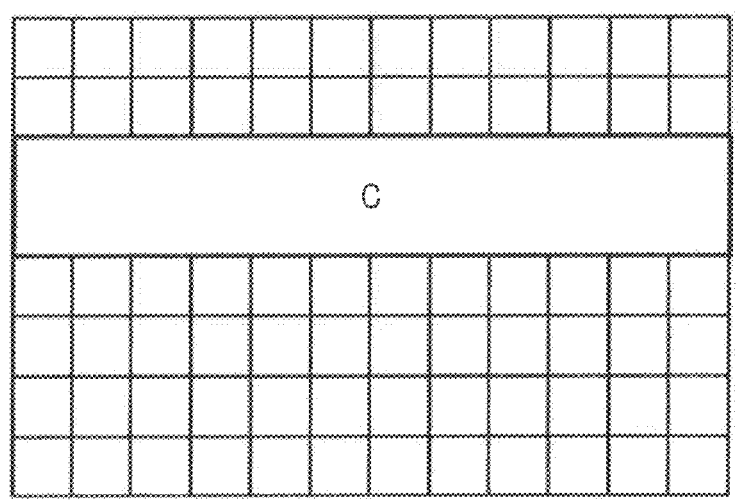

When the edge strength value is determined to be larger than the threshold value α (Yes at Step S415), the watermark embedding area is labeled as an area C (Step S416). More specifically, when the edge strength is determined to be high, watermark information embedded by deformation is relatively highly resistant; however, the embedded watermark information is likely to degrade the image quality. To this end, in the fourth embodiment, watermark information is embedded by replacing pixels in the area C so as to shift an edge by a relatively small distance as depicted in FIG. 15B (Step S418).

When the edge strength value is determined to be equal to or smaller than the threshold value α (No at Step S415), a watermark embedding area is labeled as an area D (Step S417). More specifically, when the edge strength is small, watermark information embedded by deformation is relatively vulnerable. Accordingly, in the fourth embodiment, watermark information is embedded by replacing pixels in the area D so as to shift an edge by a relatively large distance as depicted in FIG. 15A (Step S418). The embedding pertaining to Step S418 is performed in a similar manner with the manner of the first embodiment or the second embodiment.

In this manner, in the fourth embodiment, if a block includes an edge, the edge is shifted by a distance that depends on edge strength. The edge strength is determined by converting color image data into image data in luminance space. Hence, watermark information is embedded in color image data without adding a new color component by, for example, creating an intermediate color according to luminance distribution. Accordingly, even when watermark information is embedded in image data, faithful color tones of the original image can be reproduced from the image data.

Figure 16:
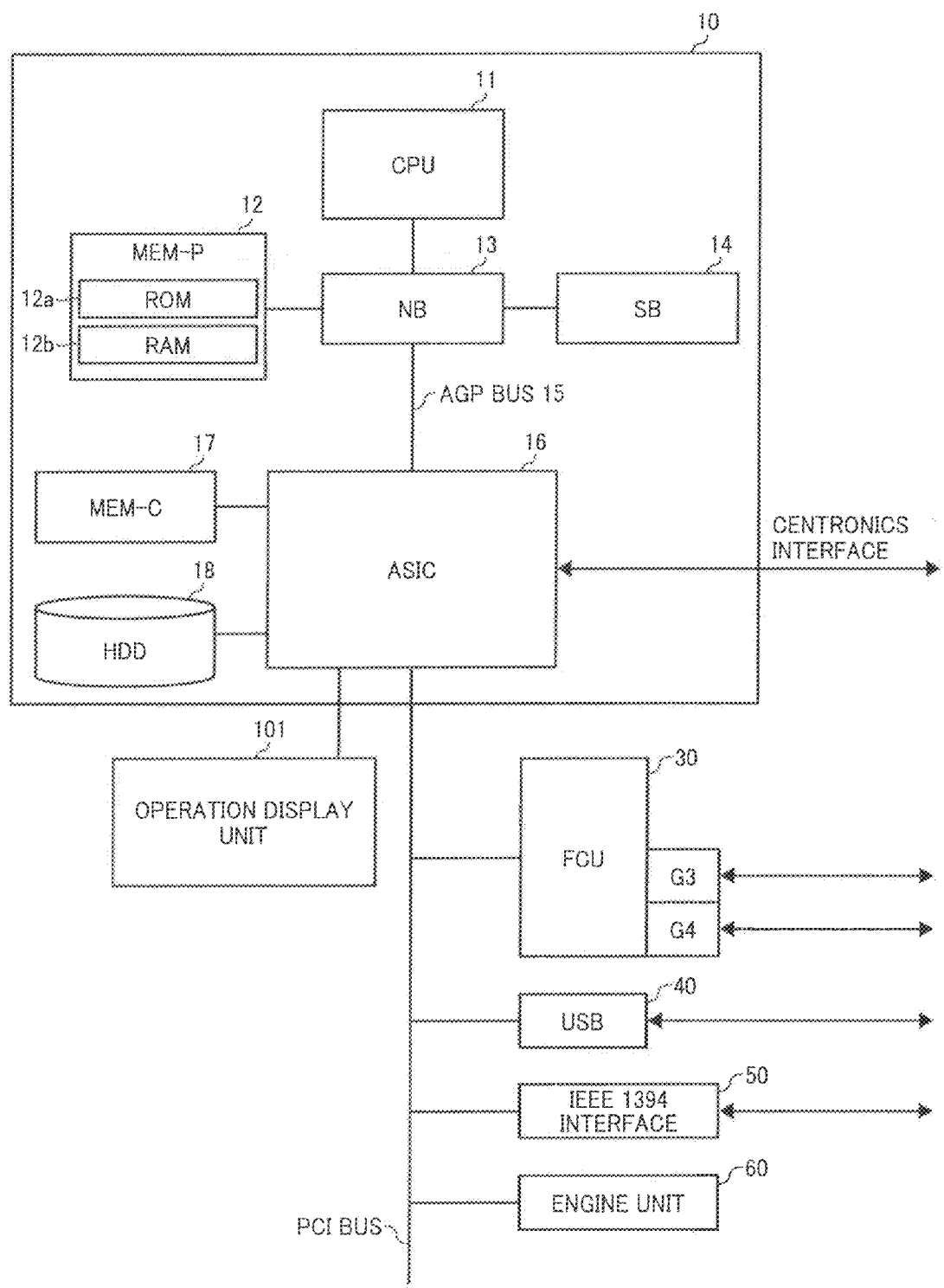
FIG. 16 is a block diagram of a hardware configuration of the MFPs according to the first to fourth embodiments.

FIG. 16 is a block diagram of a hardware configuration of the MFPs 100 to 400. Each of the MFPs 100 to 400 (hereinafter, "MFPs 100 to 400") includes a controller 10 and an engine unit 60 that are connected with each other via a peripheral component interconnect (PCI) bus. The controller 10 controls the MFPs 100 to 400 as well as controls drawing, communication, and input entered from an operation unit (not shown). The engine unit 60 is a printer engine or the like that can be connected to the PCI bus. Examples of the engine unit 60 include a monochrome plotter, a one-drum color plotter, a four-drum color plotter, a scanner, and a facsimile unit. The engine unit 60 includes, in addition to what is called an engine section such as the plotter, an image processing section that performs error diffusion, gamma conversion, and the like.

The controller 10 includes a central processing unit (CPU) 11, a north bridge (NB) 13, a system memory (hereinafter, "MEM-P") 12, a south bridge (SB) 14, a local memory (hereinafter, "MEM-C") 17, an application-specific integrated circuit (ASIC) 16, and a hard disk drive (HDD) 18. The NB 13 and the ASIC 16 are connected with each other via an accelerated graphics port (AGP) bus 15.

The CPU 11 that performs overall control of the MFPs 100 to 400 includes a chip set that includes the NB 13, the MEM-P 12, and the SB 14. The CPU 11 is connected with other devices via the chip set.

The NB 13 is a bridge that connects the CPU 11 with the MEM-P 12, the SB 14 and the AGP 15. The NB 13 includes a PCI master, an AGP target, and a memory controller that controls reading operation and writing operations from and to the MEM-P 12.

The MEM-P 12 includes a read only memory (ROM) 12a and a random access memory (RAM) 12b. The ROM 12a is a read only memory that stores therein computer programs and data. The RAM 12b is a writable and readable memory used as a memory for expanding computer programs and data therein, as a drawing memory for a printer function, and the like.

The SB 14 is a bridge that connects the NB 13 with PCI devices and peripheral devices. The SB 14 is connected with the NB 13 via the PCI bus, to which a network interface (I/F) and the like are also connected.

The ASIC 16 is an integrated circuit (IC) that includes a hardware component for use in image processing. The ASIC 16 functions as a bridge through which the AGP 15, the PCI bus, the HDD 18, and the MEM-C 17 are connected together. The ASIC 16 includes a PCI target and an AGP master, an arbiter (ARB), a memory controller, a plurality of direct memory access controllers (DMAC), and a PCI unit. The ARB is a core of the ASIC 16. The memory controller controls the MEM-C 17. The DMACs control rotation of image data by hardware logic or the like. The PCI unit transfers data between the engine unit 60 and the ASIC 16 via the PCI bus. A facsimile control unit (FCU) 30, a universal serial bus (USB) 40, and an IEEE 1394 interface 50 are connected with the ASIC 16 via the PCI bus. The operation display unit 101 is directly connected with the ASIC 16.

The MEM-C 17 is a local memory used as a buffer for storing therein images to be copied and codes. The HDD 18 is a storage device for storing therein image data, computer programs, font data, and forms.

The AGP 15 is a bus interface for a graphics accelerator card that is introduced to speed up graphics operations. The AGP 15 permits the graphics accelerator card to directly access the MEM-P 12 with a high throughput, thereby speeding up operations that involve the graphic accelerator card.

Computer programs to be executed by the MFPs 100 to 400 to perform the image processing operations according to the first to fourth embodiments can be provided in a ROM or the like.

The computer programs can be provided in a computer-readable recording medium such as, but is not limited to, a compact disc-read-only memory (CD-ROM), a flexible disk (FD), a compact disc recordable (CD-R), or a digital versatile disk (DVD) in an installable or executable format.

The computer programs can be stored in, in place of the recording medium, a computer that is connected to a network such as, but is not limited to, the Internet so that the computer programs can be downloaded from the computer via the network. The computer programs can be configured so as to be provided or distributed via a network such as the Internet.

The computer programs to be executed by the MFPs 100 to 400 to perform the image processing operations according to the first to fourth embodiments have a modular configuration that includes various modules (a reading module 121, 421, an embedded-information determining module 122, 222, an embedded-information extracting module 123, a page-number determining module 124, an image processing module 125, a print control module 126, a page-number extracting module 327, a deleting module 328, a detecting module 429, and a capacity determining module 430). From the viewpoint of actual hardware, the CPU reads the computer program from the ROM and executes the computer program to load the various modules on a main memory device. Hence, the reading module 121, 421, the embedded-information determining module 122, 222, the embedded-information extracting module 123, the page-number determining module 124, the image processing module 125, the print control module 126, the page-number extracting module 327, the deleting module 328, the detecting module 429, and the capacity determining module 430 are implemented on the main memory device.

In this manner, according to an aspect of the present invention, watermark information is embedded by replacing a pixel in the watermark embedding area with another pixel near the pixel to be replaced. Because no color component that is present in the original image is added or removed from the image data, even when watermark information is embedded in the image data, faithful color tones of the original image can be reproduced from the image data. Hence, the watermark information can be embedded without degrading the image quality. Because the deforming pattern is added to the edge zone in the watermark embedding area that is determined based on analysis of the image, even when image data to which the deforming pattern is added subjected to low-pass filtering or the like during image compression, loss of pixel information does not occur. Accordingly, it is possible to detect watermark information embedded in the image data even after image compression.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that embeds watermark information in color image data that has been divided into a plurality of blocks, each of which includes a plurality of pixels and to each of which encoding information is assigned according to a position of a first block of the plurality of blocks in an image of the color image data, the image processing apparatus comprising:

an image analyzing unit configured to output a feature value of the first block based on an analysis of image data of the first block;

a block determining unit configured to determine whether the first block is an embedding-possible block in which the watermark information can be embedded based on the feature value of the first block and to demarcate, for the embedding-possible block, a watermark embedding area that is an area in which the watermark information is to be embedded in the embedding-possible block; and an embedding unit configured to embed the watermark information by deforming the watermark embedding area of the embedding-possible block according to a pattern that represents the watermark information and replacing a pixel in the watermark embedding area with another pixel near the pixel to be replaced.

2. The image processing apparatus according to claim 1, wherein the image analyzing unit detects an edge in the first block, calculates an edge strength value indicative of edge strength of the edge, and outputs the edge strength value, the block determining unit determines the first block as the embedding-possible block when the edge strength value of the first block is larger than a predetermined threshold value, and the embedding unit assigns a value indicative of the edge strength relative to the threshold value based on the edge strength value to the embedding-possible block and replaces first pixels on the edge in the embedding-possible block with second pixels near the first pixels, the second pixels being on a side specified by the value indicative of the edge strength, thereby shifting the edge toward the side.

3. The image processing apparatus according to claim 1, wherein the color image data is gray-scaled-by-dithering color image data, and the embedding unit replaces a first group of pixels in the watermark embedding area with a second group of pixels that is arranged in an area adjacent to the first group of pixels.

4. The image processing apparatus according to claim 2, wherein the image analyzing unit causes a range of the watermark embedding area to vary depending on a result of determination as to whether each of the plurality blocks of the color image data includes a halftone dot area such that when one of the plurality of blocks is determined to include a halftone dot area, edge detection is performed by replacing a first group of pixels in the watermark embedding area with a second group of pixels, and when the one of the plurality of blocks is determined not to include a halftone dot area, edge detection is performed by replacement of the first pixels with the second pixels.

5. The image processing apparatus according to claim 1, wherein the image analyzing unit converts the color image data into image data in luminance space, detects an edge zone in the image data in luminance space to determine whether the first block includes an edge, and when the first block is determined to include an edge, the image analyzing unit obtains an edge strength value and causes a distance by which the edge is to be shifted by replacing the pixel with the other pixel near the pixel to vary depending on a result of determination as to whether the edge strength value is larger than a predetermined threshold value, the distance defining the watermark embedding area.

6. An image processing method of embedding watermark information in color image data that has been divided into a plurality of blocks, each of which includes a plurality of pixels and to each of which encoding information is assigned according to a position of a first block of the plurality of blocks in an image of the color image data, the image processing method comprising:
- outputting a feature value of the first block by analyzing image data of the first block;
- determining including determining whether the first block is an embedding-possible block in which the watermark information can be embedded based on the feature value of the first block and demarcating, for the embedding-possible block, a watermark embedding area that is an area in which the watermark information is to be embedded in the embedding-possible block; and
- embedding the watermark information by deforming the watermark embedding area of the embedding-possible block according to a pattern that represents the watermark information and replacing a pixel in the watermark embedding area with another pixel near the pixel to be replaced.

7. A non-transitory computer readable storage medium having stored thereon a computer program which when executed by a computer causes the computer to perform an image processing method of embedding watermark information in color image data that has been divided into a plurality of blocks, each of which includes a plurality of pixels and to each of which encoding information is assigned according to a position of a first block of the plurality of blocks in an image of the color image data, the image processing method comprising:
- outputting a feature value of the first block by analyzing image data of the first block;
- determining including determining whether the first block is an embedding-possible block in which the watermark information can be embedded based on the feature value of the first block and demarcating, for the embedding-possible block, a watermark embedding area that is an area in which the watermark information is to be embedded in the embedding-possible block; and
- embedding the watermark information by deforming the watermark embedding area of the embedding-possible block according to a pattern that represents the watermark information and replacing a pixel in the watermark embedding area with another pixel near the pixel to be replaced.

* * * * *